(12) United States Patent
Huang

(10) Patent No.: US 6,247,882 B1
(45) Date of Patent: Jun. 19, 2001

(54) CARGO BRACING DEVICE

(76) Inventor: May Huang, 7F, No. 46, Pin Ho 10 Street, Chang Hua 500 (TW)

( * ) Notice: Subject to any disclaimer, the term of this patent is extended or adjusted under 35 U.S.C. 154(b) by 0 days.

(21) Appl. No.: 09/612,624

(22) Filed: Jul. 4, 2000

(30) Foreign Application Priority Data

Mar. 28, 2000 (TW) .............................................. 088222597

(51) Int. Cl.[7] ...................................................... B60P 7/15
(52) U.S. Cl. ............................................ 410/151; 410/143
(58) Field of Search .................................. 410/143, 145, 410/151; 211/105.3; 248/354.6, 354.7; 254/12, 95, 108, 247; 74/141.5, 143, 167

(56) References Cited

U.S. PATENT DOCUMENTS

| | | | |
|---|---|---|---|
| 4,669,934 | * | 6/1987 | Wisecarrer ............................ 410/151 |
| 5,094,576 | * | 3/1992 | Fredelius ............................... 410/151 |
| 5,443,342 | * | 8/1995 | Huang .................................. 410/151 |
| 5,769,580 | * | 6/1998 | Purris .................................. 410/151 |
| 5,947,666 | * | 9/1999 | Huang .................................. 410/151 |
| 5,988,963 | * | 11/1999 | Shiau .................................. 410/151 |

\* cited by examiner

Primary Examiner—Stephen T. Gordon

(57) ABSTRACT

A bracing device includes a rod slidably received in a tube and having a number of depressions. A level is pivotally secured to the tube and has a pawl for engaging with either of the depressions of the rod. A blade is pivotally secured to the tube and has a bulge for engaging with either of the depressions of the rod. A shaft is slidably received in the tube and engaged with the blade for biasing the bulge to engage with either of the depressions of the rod. The shaft is selectively engaged with the lever for selectively forcing the pawl to secure the rod to the tube.

5 Claims, 4 Drawing Sheets

US 6,247,882 B1

CARGO BRACING DEVICE

BACKGROUND OF THE INVENTION

1. Field of the Invention

The present invention relates to a bracing device and more particularly to a cargo bracing device.

2. Description of the Prior Art

Typical cargo bracing devices comprise a rod slidably received in a tube, and a lever or the like rotatably secured to the tube and having a gear engaged with the rod for moving the rod relative to the tube. A complicated ratchet device is required to be provided and secured to the tube and engaged with the rod for securing or positioning the rod to the tube when the gear of the lever is disengaged from the rod and is to be engaged with the other portion of the rod.

The present invention has arisen to mitigate and/or obviate the afore-described disadvantages of the conventional cargo bracing devices.

SUMMARY OF THE INVENTION

The primary objective of the present invention is to provide a cargo bracing device having a simplified configuration for allowing the cargo bracing device to be easily and quickly and cheaply manufactured.

In accordance with one aspect of the invention, there is provided a bracing device comprising a tube including a first end, a rod slidably received in the tube and slidably engaged into the tube via the first end of the tube, the rod including a plurality of depressions formed therein, a level pivotally secured to the first end of the tube and including a pawl provided thereon for engaging with either of the depressions of the rod and for securing the rod to the tube, a blade pivotally secured to the first end of the tube and including a bulge extended therefrom for engaging with either of the depressions of the rod, and a shaft slidably received in the first end of the tube and engaged with the blade for biasing the bulge to engage with either of the depressions of the rod, the shaft being selectively engaged with the lever for forcing the pawl of the lever to engage with either of the depressions of the rod and to secure the rod to the tube, and for selectively releasing the pawl of the lever from the depressions of the rod and for allowing the rod to be moved relative to the tube.

The tube includes a sleeve secured to the first end and having two flaps for slidably receiving the shaft. The shaft includes a pole extended therefrom and having a size smaller than that of the shaft, the pawl of the lever is forced to engage with either of the depressions of the rod when the lever is engaged with the shaft, and the pawl is allowed to be disengaged from the depressions of the rod when the pole of the shaft is moved to be engaged with the lever.

A first flap includes an orifice for receiving the shaft, a second flap includes an aperture having a size smaller than that of the orifice of the first flap for slidably receiving the pole. The pole includes a first groove and at least one second groove formed therein, the blade includes a projection for selectively engaged into the first groove and the second groove.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
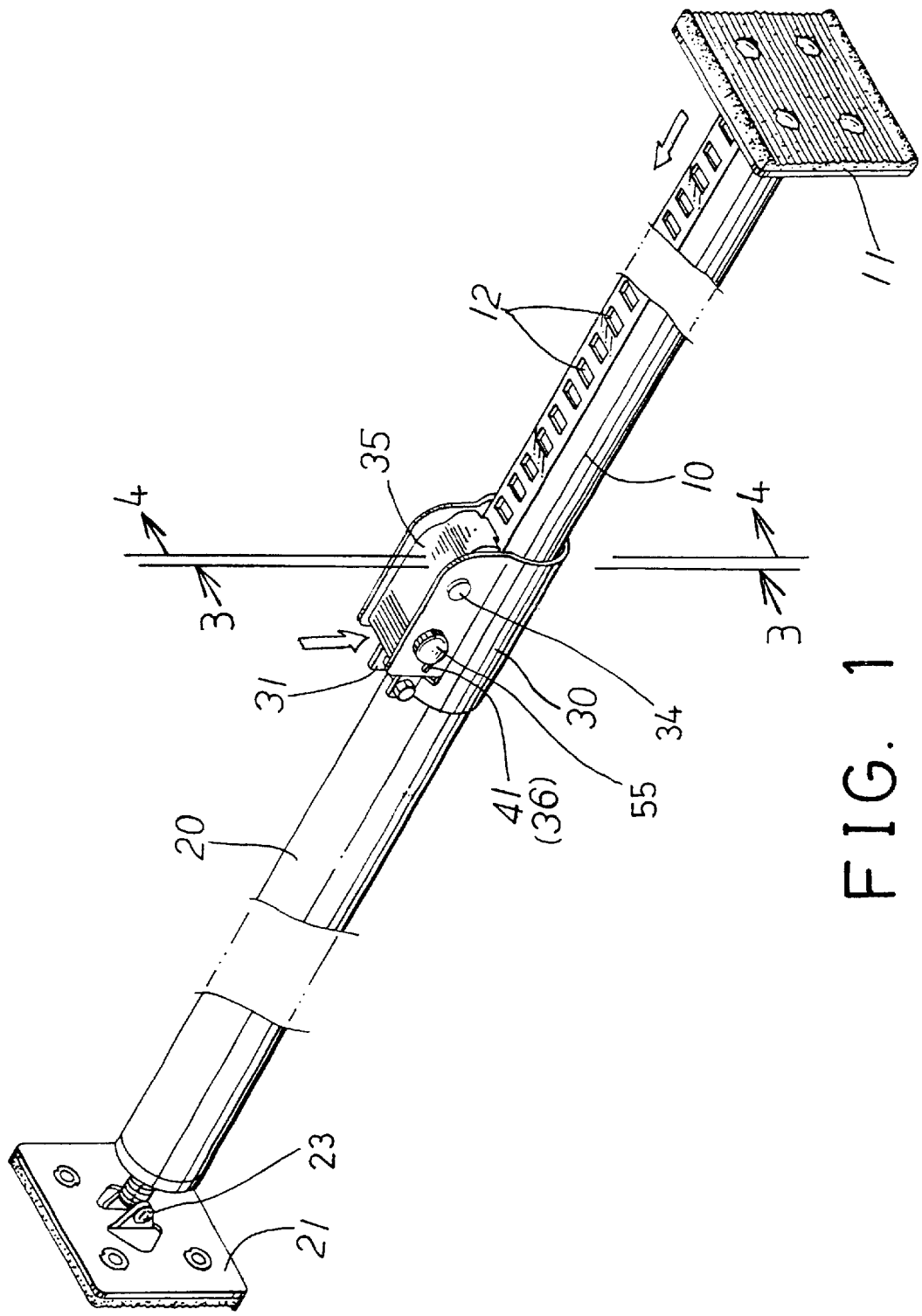
FIG. 1 is a perspective view of a cargo bracing device in accordance with the present invention.
Figure 2:
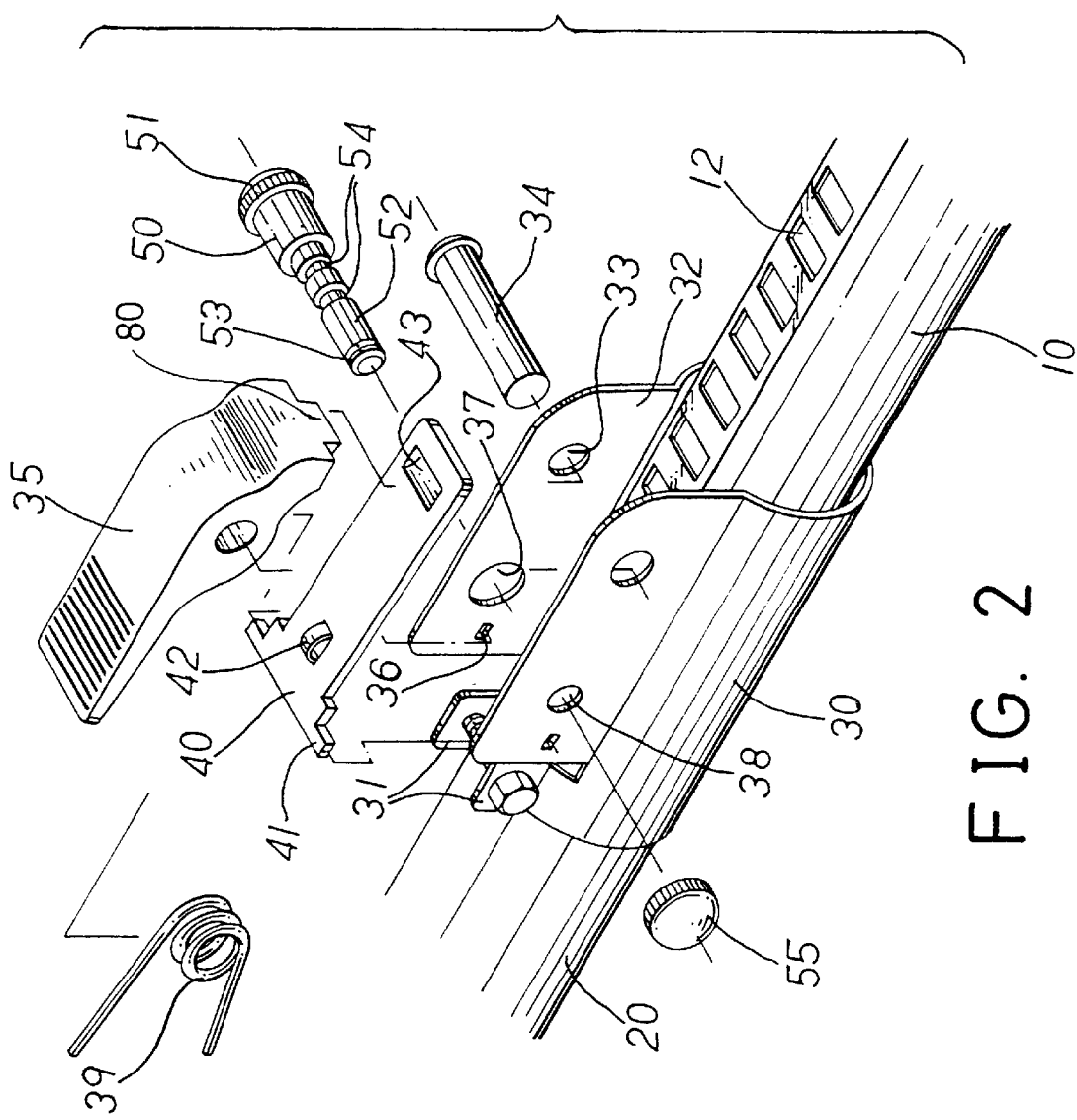
FIG. 2 is a partial exploded view of the cargo bracing device.

Referring to the drawings, and initially to FIGS. 1–5, a cargo bracing device in accordance with the present invention comprises a rod 10 slidably received in a tube 20 and including an upper portion having a number of depressions 12 formed therein. The rod 10 and the tube 20 each includes one end having a block 11, 21 provided or secured thereon for engaging with the cargo to be secured or braced on a truck or the like. The block 11, 21 may be rotatably or pivotally secured to the rod 10 or the tube 20 with a pivot axle 23, for allowing the blocks 11, 21 to be solidly and stably engaged with the cargo.

A sleeve 30 is secured to one end of the tube 20 with a bracket device 31 and/or fasteners, and includes a pair of flaps 32 extended therefrom and preferably parallel to each other. The flaps 32 may be directly extended from the tube 20 instead of being extended from the sleeve 30. A blade 40 has one end pivotally secured to the flaps 32, and preferably includes two ears 41 laterally extended outward from the one end of the blade 40 and extended away from each other for engaging through the holes 36 of the flaps 32 and for pivotally or rotatably securing the blade 40 to the flaps 32 or to the sleeve 30. The blade 40 includes a bulge 43, particularly a curved bulge 43, extended downward from the other end of the blade 40 for engaging with either of the depressions 12 of the rod 10. The blade 40 includes a projection 42 extended upward therefrom and located close to the one end thereof or located close to the ears 41 of the blade 40.

A lever 35 is pivotally secured to the flaps 32 at a pivot pin 34 which is engaged through the holes 33 of the flaps 32. For example, the middle portion of the lever 35 is pivotally secured to the flaps 32 or the sleeve 30 with the pivot pin 34. The lever 35 includes a pawl 80 formed or provided on one end thereof. A spring 39 is engaged on the pin 34 and engaged with the lever 35 for biasing the pawl 80 of the lever 35 to engage with either of the depressions 12 of the rod 10 and to selectively secure the rod 10 to the sleeve 30 and thus to the tube 20. One of the flaps 32 includes an orifice 37 formed therein and having a size or a diameter greater than that of an aperture 38 formed in the other flap 32.

A shaft 50 is slidably received in the orifice 37 of the flap 32 and includes a head 51 engaged with the flap 32 for limiting the relative sliding movement of the shaft 50 relative to the flap 32. The shaft 50 includes a pole 52 extended therefrom and having a reduced size than that of the shaft 50, for slidably engaging in the aperture 38 of the flap 32 that has a size or a diameter smaller than the orifice 37 of the flap 32. A lid 55 is secured to the pole 52, or is threaded to the outer thread 53 of the pole 52 and engageable with the flap 32 for limiting the relative sliding movement of the shaft 50 relative to the flap 32. The shaft 50 and/or the pole 52 includes two grooves 54 formed therein for selectively receiving the projection 42 and for selectively positioning the shaft 50 to the sleeve 30 and the level 35 at the required positions.

Figure 4:
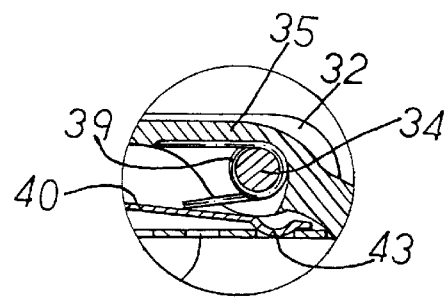
FIG. 4 is a partial cross sectional view taken along lines 4—4 of FIG. 1.
Figure 3:
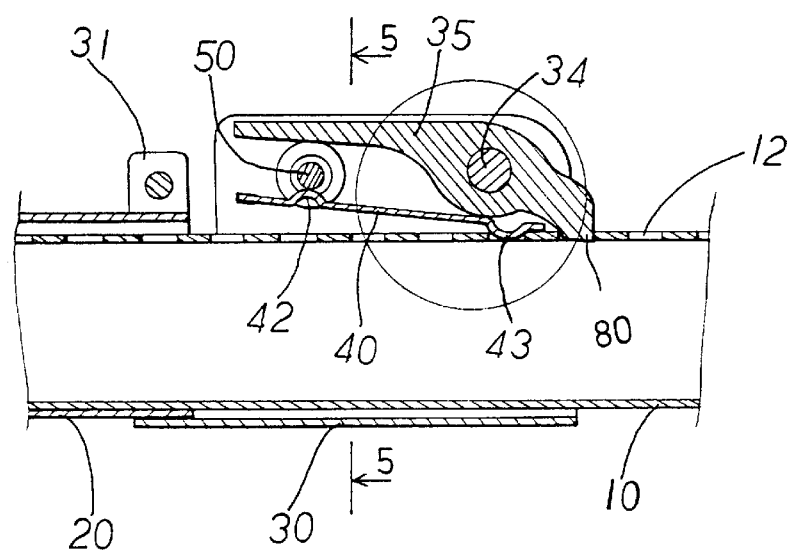
FIG. 3 is a cross sectional view taken along lines 3—3 of FIG. 1.
Figure 5:
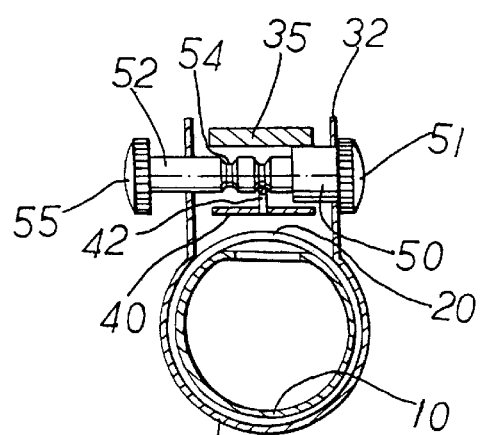
FIG. 5 is a cross sectional view taken along lines 5—5 of FIG. 3.

In operation, as shown in FIGS. 3–5, when the shaft 50 is moved inward of the flaps 32 and located below the lever 35 and engaged with the level 35 (FIG. 5), the projection 42 may be engaged with or into one of the grooves 54, such that the level 35 may not be depressed or moved relative to the shaft 50. The pawl 80 may be forced to engage with either of the depressions 12 of the rod 10 (FIG. 3) and to lock the rod 10 in the tube 20. At this moment, the bulge 43 of the blade 40 may also be forced to engage with or into either of the depressions 12 of the rod 10.

Figure 8:
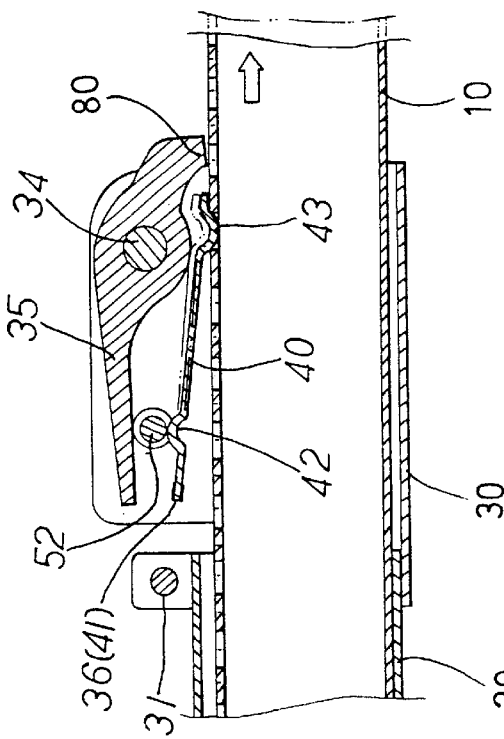
FIG. 8 is a cross sectional view taken along lines 8—8 of FIG. 6.
Figure 7:
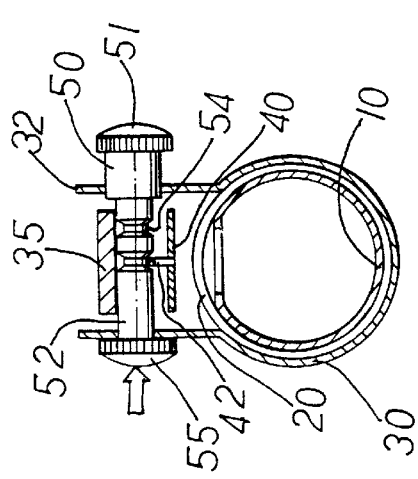
FIGS. 6 and 7 are cross sectional views similar to FIG. 3, illustrating the operation of the cargo bracing device.
Figure 6:
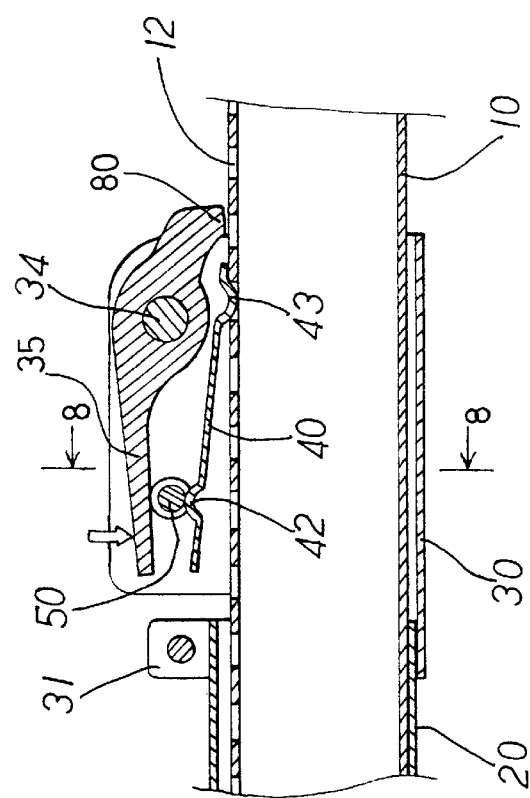

As shown in FIGS. 6–8, when the pole 52, of a reduced size than the shaft 50, is moved inward of the flaps 32 and located below the lever 35 (FIG. 8), the projection 42 may be engaged with the other groove 54 of the pole 52 or of the shaft 50, and the lever 35 may thus be released and depressed downward, against the spring 39, to contact and to engage with the pole 52, the pawl 80 may thus be disengaged from the depressions 12 of the rod 10 such that the rod 10 may be moved relative to the tube 20. The bulge 43 of the blade 40 may still be biased to engage with or into either of the depressions 12 of the rod 10 and to resiliently or to releasably securing the rod 10 to the tube 20. The bulge 43 of the blade 40 may be forced to be disengaged from one of the depressions 12 of the rod 10 and to be engaged with or into the other of the depressions 12 of the rod 10 when the rod is moved relative to the tube 20 (FIG. 7). The engagement of the projection 42 of the blade 40 with the shaft 50 or the pole 52 may bias the bulge 43 of the blade 40 to be resiliently engaged with or into either of the depressions 12 of the rod 10.

Accordingly, the cargo bracing device in accordance with the present invention includes a simplified configuration for allowing the cargo bracing device to be easily and quickly and cheaply manufactured.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A bracing device comprising:
   a tube including a first end,
   a rod slidably received in said tube and slidably engaged into said tube via said first end of said tube, said rod including a plurality of depressions formed therein,
   a lever pivotally secured to said first end of said tube and including a pawl provided thereon for engaging with any of said depressions of said rod and for securing said rod to said tube,
   a blade pivotally secured to said first end of said tube and including a bulge extended therefrom for engaging with any of said depressions of said rod, and
   a shaft slidably received in said first end of said tube and engaged with said blade for biasing said bulge to engage with any of said depressions of said rod, said shaft being selectively engaged with said lever for forcing said pawl of said lever to engage with any of said depressions of said rod and to secure said rod to said tube, and for selectively releasing said pawl of said lever from said depressions of said rod and for allowing said rod to be moved relative to said tube.

2. The bracing device as claimed in claim 1, wherein said tube includes a sleeve secured to said first end thereof, said sleeve includes two flaps extended therefrom for slidably receiving said shaft.

3. The bracing device as claimed in claim 2, wherein said shaft includes a pole extended therefrom and having a size smaller than that of said shaft, said pawl of said lever is forced to engage with any of said depressions of said rod when said lever is engaged with said shaft, and said pawl of said lever is allowed to be disengaged from said depressions of said rod when said pole of said shaft is moved to be engaged with said lever.

4. The bracing device as claimed in claim 3, wherein a first flap of said flaps includes an orifice formed therein for receiving said shaft, a second flap of said flaps includes an aperture formed therein and having a size smaller than that of said orifice of said first flap for slidably receiving said pole.

5. The bracing device as claimed in claim 3, wherein said pole includes a first groove and at least one second groove formed therein, said blade includes a projection for selectively engaged into said first groove and said at least one second groove.

* * * * *